(12) United States Patent
Boehl et al.

(10) Patent No.: US 8,918,260 B2
(45) Date of Patent: Dec. 23, 2014

(54) VEHICLE-SUPPORTED DATA PROCESSING SYSTEM

(75) Inventors: Eberhard Boehl, Reutlingen (DE); Werner Harter, Illingen (DE)

(73) Assignee: Robert Bosch GmbH, Stuttgart (DE)

( * ) Notice: Subject to any disclaimer, the term of this patent is extended or adjusted under 35 U.S.C. 154(b) by 699 days.

(21) Appl. No.: 12/308,343

(22) PCT Filed: Dec. 7, 2007

(86) PCT No.: PCT/EP2007/063489
§ 371 (c)(1),
(2), (4) Date: Oct. 15, 2010

(87) PCT Pub. No.: WO2008/077739
PCT Pub. Date: Jul. 3, 2008

(65) Prior Publication Data
US 2011/0022281 A1 Jan. 27, 2011

(30) Foreign Application Priority Data

Dec. 22, 2006 (DE) .......................... 10 2006 061 272

(51) Int. Cl.
*B60T 8/17* (2006.01)
*B60T 8/32* (2006.01)
*B60T 8/88* (2006.01)

(52) U.S. Cl.
CPC ........... *B60T 8/321* (2013.01); *B60T 2270/413* (2013.01); *B60T 8/885* (2013.01)
USPC ................................................. 701/70; 701/1

(58) Field of Classification Search
CPC ................ G06F 7/00; H02J 7/00; B60T 8/00; B60T 13/72; B60T 7/12; H04J 1/16; H04J 3/14; H04L 12/24; H04L 12/42; B60R 16/03

USPC .............. 701/70, 1, 55, 29.2; 367/76; 60/445, 60/413; 903/910, 960; 370/216, 245; 307/9.1, 10.1; 713/340; 363/60; 123/406.57; 303/20; 320/134; 340/425.5

See application file for complete search history.

(56) References Cited

U.S. PATENT DOCUMENTS 4,546,437 A * 10/1985 Bleckmann et al. ............ 701/70
5,079,759 A * 1/1992 Kajiyama ...................... 370/245

(Continued)

FOREIGN PATENT DOCUMENTS

JP 2-83842 3/1990
JP 10-76925 3/1998

(Continued)

*Primary Examiner* — Tuan C. To
*Assistant Examiner* — Yuri Kan
(74) *Attorney, Agent, or Firm* — Kenyon & Kenyon LLP

(57) ABSTRACT

A vehicle-supported data processing system includes a plurality of processing units communicating with one another via a bus system, which are each supplied with operating power by at least one of the at least two different vehicle electrical systems. Multiple transmitter units for control information and multiple receiver units for the control information are among the processing units. The bus system is a ring bus, in which each processing unit is connected to at least two adjacent processing units by a bus segment in each case. The ring bus is divided, by potential separating devices, which are incorporated in the bus segments which connect processing units powered by different vehicle electrical systems, into a number of sections, which is smaller than the number of the processing units.

23 Claims, 3 Drawing Sheets

(56) References Cited

U.S. PATENT DOCUMENTS

| | | | |
|---|---|---|---|
| 5,675,189 A * | 10/1997 | Anma et al. | 307/9.1 |
| 5,773,962 A * | 6/1998 | Nor | 320/134 |
| 5,943,315 A * | 8/1999 | Iwasawa et al. | 370/216 |
| 5,978,352 A * | 11/1999 | Imaizumi et al. | 370/216 |
| 6,046,511 A * | 4/2000 | Kincaid | 307/10.1 |
| 6,430,478 B2 * | 8/2002 | Heckmann et al. | 701/1 |
| 7,433,771 B2 * | 10/2008 | Herges | 701/70 |
| 7,685,452 B2 * | 3/2010 | Camagna et al. | 713/340 |
| 8,013,468 B2 * | 9/2011 | Lohr | 307/9.1 |
| 2002/0113690 A1 * | 8/2002 | Becker et al. | 340/425.5 |
| 2005/0162006 A1 * | 7/2005 | Nilsson et al. | 303/20 |
| 2007/0250242 A1 * | 10/2007 | Herges | 701/70 |
| 2008/0269997 A1 * | 10/2008 | Ezoe et al. | 701/70 |
| 2008/0276905 A1 * | 11/2008 | Czimmek | 123/406.57 |
| 2008/0278978 A1 * | 11/2008 | Czimmek | 363/60 |
| 2009/0302679 A1 * | 12/2009 | Bryan et al. | 307/10.1 |
| 2011/0022281 A1 * | 1/2011 | Boehl et al. | 701/70 |
| 2011/0166744 A1 * | 7/2011 | Lu et al. | 701/34 |
| 2011/0264345 A1 * | 10/2011 | Heim et al. | 701/70 |

FOREIGN PATENT DOCUMENTS

| | | |
|---|---|---|
| JP | 2000-173674 | 6/2000 |
| JP | 2004-147179 | 5/2004 |
| JP | 2005-67243 | 3/2005 |
| JP | 2006-13621 | 1/2006 |

* cited by examiner

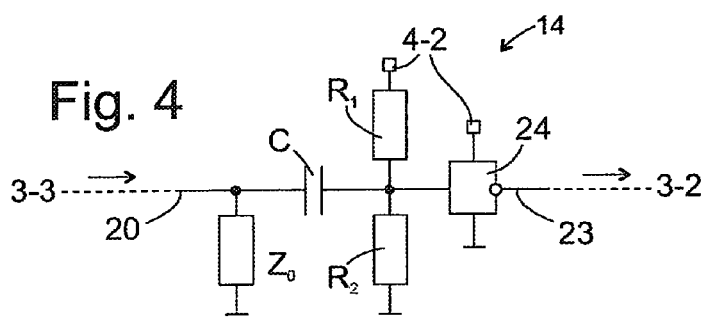
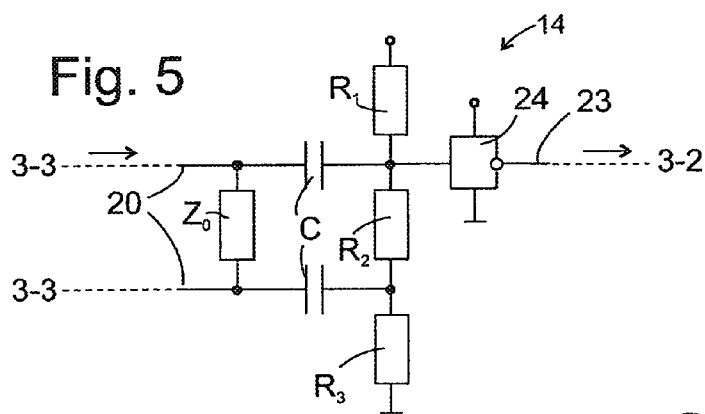
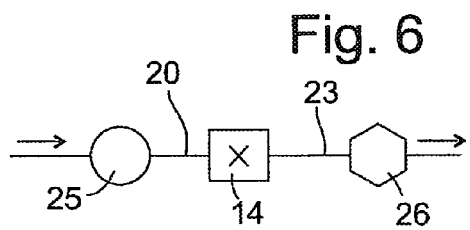
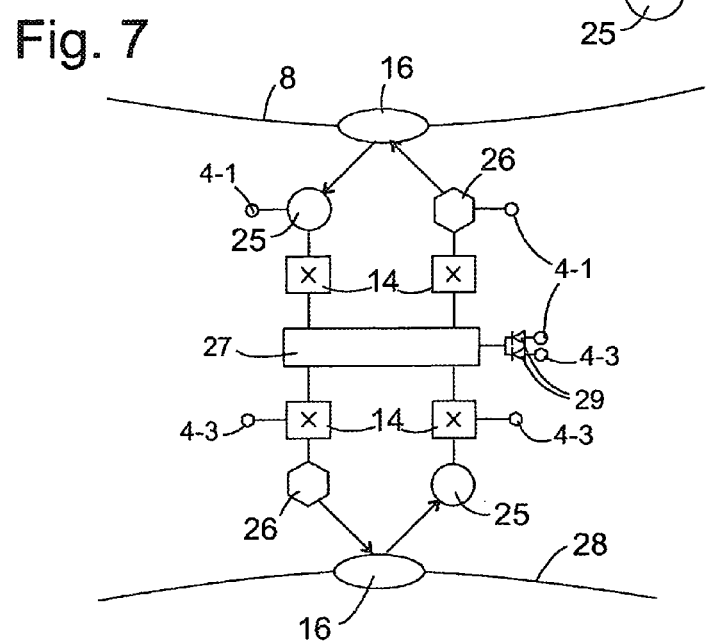

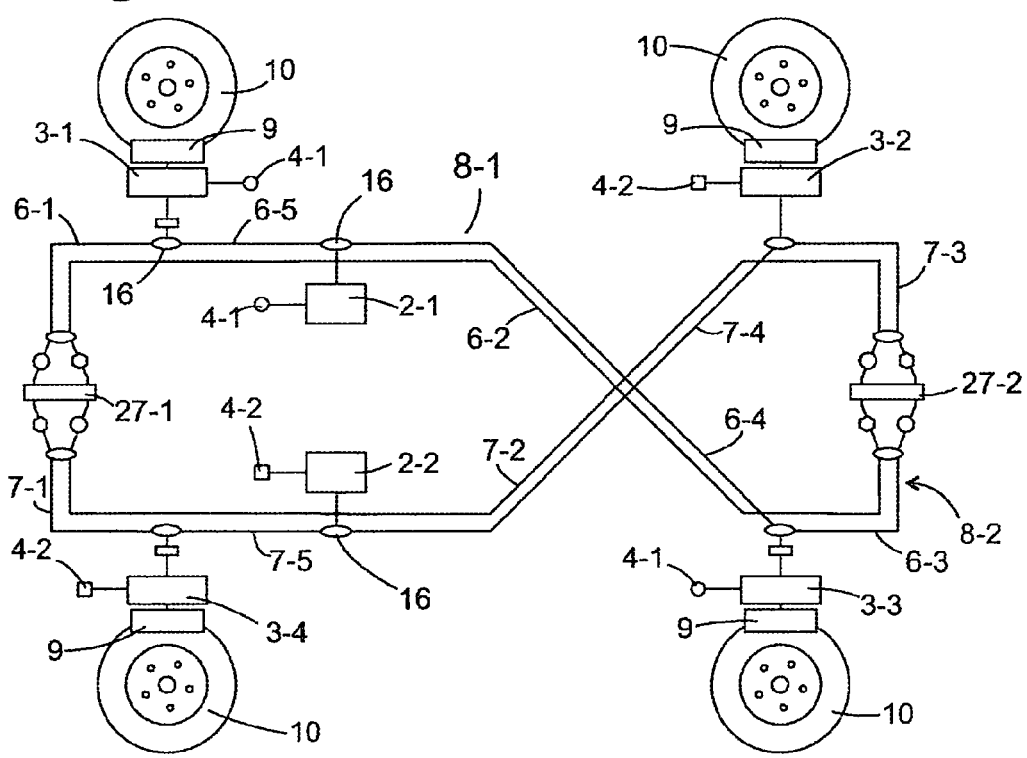

VEHICLE-SUPPORTED DATA PROCESSING SYSTEM

FIELD OF THE INVENTION

The present invention relates to a vehicle-supported data processing system having a plurality of processing units communicating with one another via a bus system, which are each supplied with operating power by at least one of at least two different vehicle electrical systems.

BACKGROUND INFORMATION

Such a data processing system used for controlling brakes of the vehicle is discussed in DE 19 634 567 A1.

This typical system includes a pedal unit, which establishes reference variables for partial braking forces for the wheels of the front axle and rear axle, and wheel pair units, which receive the reference variables and output activation variables for electric actuators of the brakes. The bus system is divided into a first communication system, via which the first wheel pair unit powered by a first vehicle electrical system communicates with the pedal unit, and a second communication system, via which the second wheel pair unit powered by a second vehicle electrical system communicates with the pedal unit. The division of the bus system into two separate communication systems allows continuation of the communication with the remaining wheel pair unit if one wheel pair unit or the vehicle electrical system powering it fails, so that the brakes controlled by this wheel pair unit remain capable of acting. However, a line interruption on one of the communication systems results in the failure of the communication between units connected to this communication system in any case, so that the danger of partial failure of the brake system is not negligible.

A ring bus system which allows undisturbed continuation of the communication of units with one another in case of interruption of a single connection between two units is discussed in DE 10 223 007 A1. If one considers the possibility of powering units of this known system by various vehicle electrical systems, it may be seen that a failure of a vehicle electrical system which powers multiple units will very probably result in a complete failure of the communication on the ring bus.

SUMMARY OF THE INVENTION

There is therefore a need for a vehicle-supported data processing system, which combines insensitivity to the failure of a single voltage supply with insensitivity to the interruption of a connection between units of the system.

This need is satisfied according to the exemplary embodiments and/or exemplary methods of the present invention by a vehicle-supported data processing system having a plurality of processing units communicating with one another via a bus system, which are each supplied with operating power by at least one of at least two different vehicle electrical systems, each processing unit including multiple transmitter units for control information and multiple receiver units for the control information, the bus system being a ring bus, in which each processing unit is connected to at least two adjacent processing units by one bus segment in each case, and in which the ring bus is divided, by potential separating devices incorporated in the bus segments which connect two processing units powered by different vehicle electrical systems, into a number of sections which is smaller than the number of the processing units.

In such a data processing system, in the worst case, the failure of one processing unit or its vehicle electrical system may only result in the interruption of the communication via this processing unit or the processing units powered by the affected vehicle electrical systems; processing units powered by another vehicle electrical system, more than one of which lie on the same section, are not affected by the interruption.

To maintain the communication capability as much as possible in the event of failure of a vehicle electrical system, the sections are to be as few as possible or, as the case may be, are each to include as many processing units as possible. Therefore, the number of the sections may be equal to the number of the vehicle electrical systems.

If the failure of one processing unit or its vehicle electrical system has the result that data traffic is no longer possible via the affected processing unit, it is expedient if the ring bus is bidirectional and reconfigurable.

Furthermore, to minimize the consequences of a vehicle electrical system failure, each receiver unit may be designed to exclusively or at least preferentially process instructions of a transmitter unit which is powered by the same vehicle electrical system as the receiver unit.

The potential separating devices may include optocouplers or capacitors connected between a data input and output. Further possibilities for potential separation are inductive couplers or piezoelectric transducer pairs, in which one transducer converts an applied electrical voltage into a deformation of a crystal lattice and this deformation is detected by a complementary transducer and converted back into a voltage.

If a capacitor is used in a potential separating device, it is expedient for the capacitor to be connected to the data output via a threshold value circuit having a high-resistance input. Such a threshold value circuit allows a plurality of receivers or one receiver having a low-resistance input to be driven with the aid of a charge shifted slightly via the capacitor.

The processing of the control information in the receiver units may be based on each of the receiver units controlling one of multiple identical devices of the vehicle on the basis of the received control information. Because multiple identical devices such as brakes on wheels of the vehicle are provided, the effect intended by the controller does not disappear entirely if one of these devices fails.

The receiver units of the brakes of wheels lying diagonally opposite on the vehicle may lie on the same section of the ring bus and are therefore also powered by the same vehicle electrical system. Thus, in the event of failure of one vehicle electrical system, the brakes of a diagonal wheel pair, whose receiver units are powered by different vehicle electrical systems, remain operationally ready.

At least one gateway may be among the processing units, which supports the data traffic between the ring bus and a second bus connected to the gateway. This second bus may be any bus normally used in the field of motor vehicle electronics, such as a CAN, LIN, MOST, or FlexRay bus, via which error messages originating from processing units connected to the ring bus, for example, may be transferred to a display device to display them to the driver.

Further features and advantages of the exemplary embodiments and/or exemplary methods of the present invention result from the following description of exemplary embodiments with reference to the appended drawings.

BRIEF DESCRIPTION OF THE DRAWINGS

FIG. 4 shows a second embodiment of a potential separating device.

FIG. 5 shows a third embodiment of a potential separating device.

FIG. 6 shows a potential separating device in series with an encoder and a decoder.

FIG. 7 shows a gateway which connects the ring bus to a second bus.

FIG. 8 shows a ring bus system having bus sections connected via gateways.

DETAILED DESCRIPTION

Figure 1:
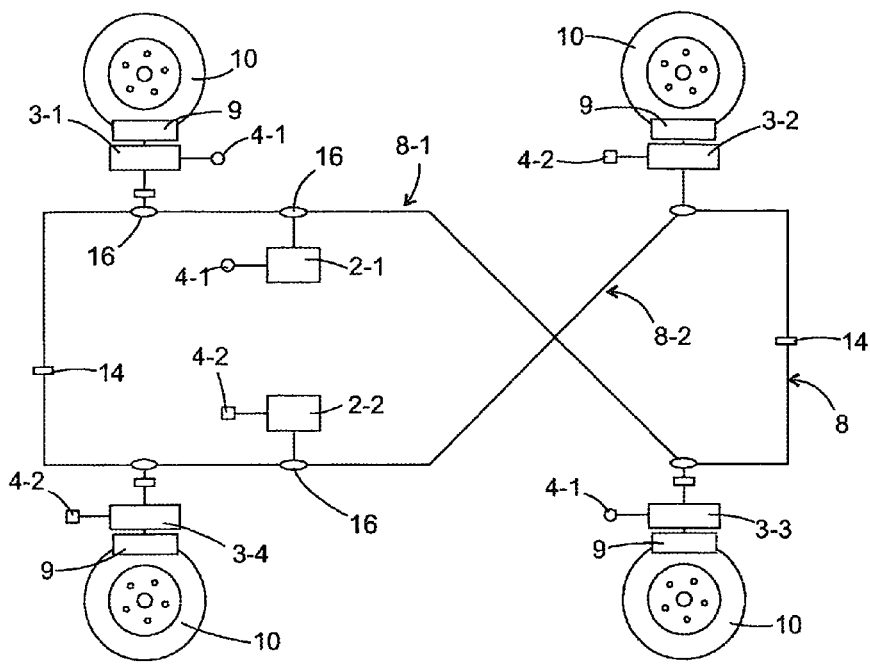
FIG. 1 shows a schematic illustration of a data processing system according to the present invention.

FIG. 1 is a block diagram of a motor vehicle brake system according to a first embodiment of the present invention. The system includes two control units 2-1, 2-2, which, on the basis of a sampled position of a brake pedal (not shown), generate control instructions for wheel units 3-1, 3-3, 3-4, which are situated on individual wheels 10 of the motor vehicle to activate actuators of brakes 9 on the basis of the received instructions. Instructions from control units 2-1, 2-2 to wheel units 3-1 through 3-4 and possibly feedback of the wheel units to the control units are transmitted via a ring bus 8. Control unit 2-1 and wheel units 3-1 of the right front wheel and 3-3 of the left rear wheel are powered by a first vehicle electrical system 4-1; control unit 2-2 and wheel units 3-2 of the right rear wheel and 3-4 of the left rear wheel are powered by a second vehicle electrical system 4-2. Control unit 2-1 or 2-2 is set up to address instructions to wheel units 3-1, 3-3 or 3-2, 3-4 powered by the same vehicle electrical system 4-1 or 4-2 as itself. It may be provided that the individual wheel units not only execute instructions addressed thereto, but rather, if such instructions are not received, also instructions addressed to another wheel unit. Thus, if a control unit fails, the brakes assigned thereto may remain active.

Ring bus 8 is divided into two sections 8-1, 8-2 by potential separating devices 14, which are each situated in the bus segments connecting wheel units 3-1 and 3-4 or 3-2 and 3-3, all units lying on the same section 8-$i$, $i$=1, 2 of ring bus 8 being powered by identical vehicle electrical system 4-$i$. It is thus ensured that if the failure of a vehicle electrical system, such as vehicle electrical system 4-2, no longer allows data transmission via processing units 2-2, 3-2, 3-4 powered by this vehicle electrical system, units 2-1, 3-1, 3-3 powered by other vehicle electrical system 4-1 are all connected by functioning bus segments, so that the communication between them may be maintained.

Figure 2:
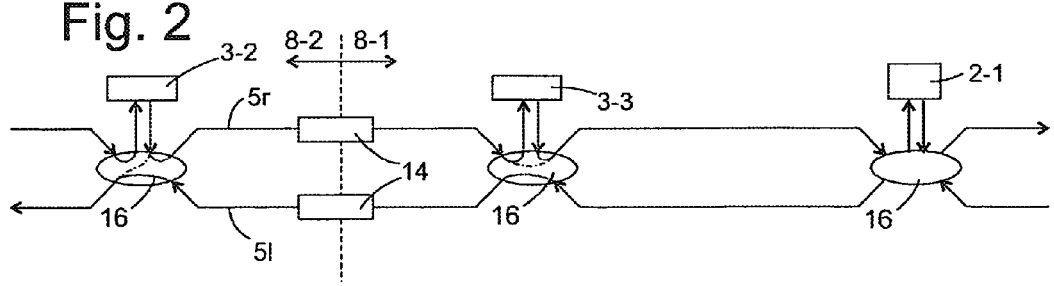
FIG. 2 shows an exemplary segment structure of the ring bus of FIG. 1.

FIG. 2 shows a detail of the data processing system according to a refinement of the exemplary embodiments and/or exemplary methods of the present invention. Ring bus 8 includes two unidirectional rings 5$r$, 5$l$ transmitting in opposing directions here. Each segment of such a unidirectional ring 5$r$, 5$l$ connects two data branches 16 of adjacent processing units 2-1, ..., 3-4, units 3-2, 3-3, 2-2 being shown in the detail shown in FIG. 2. In a normal operating state, for example, data branch 16 of wheel unit 3-3 connects the segment of line 5$r$ coming from wheel unit 3-2 to a data input of wheel unit 3-3 and a data output of the same unit 3-3 to a segment leading to control unit 2-2 as well as a segment of ring 5$l$ coming from control unit 2-2 to a further segment leading to wheel unit 3-2. In the normal operating state, data transmission occurs solely on ring 5$r$. Empty data frames are transmitted from each data branch 16 to the next on line 5$l$.

In the event of a failure of vehicle electrical system 4-1 of wheel unit 3-3, data branch 16 decouples wheel unit 3-3 from ring 5$r$ and connects its two segments directly to one another, as symbolized in the figure by a dot-dash line. If this occurs in the same way on the data branches of all units powered by vehicle electrical system 3-1, ring 5$r$ remains closed in spite of the failure and units 3-2, 2-2, 3-4 may communicate with one another via the ring undisturbed.

If a malfunction has the result that data transmission is no longer possible in section 8-2, the frame signal on ring 5$l$ also no longer reaches from data branch 16 of wheel unit 3-3 to that of wheel unit 3-2. If this is recognized at the level of wheel unit 3-2, data branch 16 of this wheel unit 3-2 responds by disconnecting the data output of wheel unit 3-2 from the segment of ring 5$r$ leading to unit 3-3 and connecting it to the segment of ring 5$l$ leading to control unit 2-1, as again indicated by a dot-dash line.

If vehicle electrical system 4-1 fails, this not only has the result that wheel unit 3-1 powered by this vehicle electrical system 4-1 no longer transmits data via ring 5$r$ to wheel unit 3-4, but also the frame signal in which these data are incorporated drops out on the segment of ring 5$r$ connecting these two units. Normally powered wheel unit 3-4 does still relay the frame signal to control unit 2-2, but does not receive any data from units upstream from it on ring 5$r$ to transmit this data further to wheel unit 2-2. In a similar way as described above, wheel unit 3-4 recognizes that the frame signal is not arriving from wheel unit 3-1, upon which the segment of ring 5$l$ coming from control unit 2-2 is connected to the data input of wheel unit 3-4 in its data branch 16, while the data output remains connected to the segment of ring 5$r$ leading to control unit 2-2.

Through the switchover measures described above in data branches 16 of wheel units 3-2, 3-4, section 8-2 is reconfigured into a unidirectional ring bus, via which units 2-2, 3-2, 3-4 powered by vehicle electrical system 4-2 may communicate further with one another unrestrictedly. The functional capability of brakes 9 controlled by wheel units 3-2, 3-4 is therefore not impaired by the failure of vehicle electrical system 4-1.

Potential separating devices 14 are provided in every segment of rings 5$r$, 5$l$, which connects the processing units powered by various vehicle electrical systems to one another, i.e., in the segments extending between wheel units 3-1 and 3-4 or 3-3, 3-2.

Figure 3:
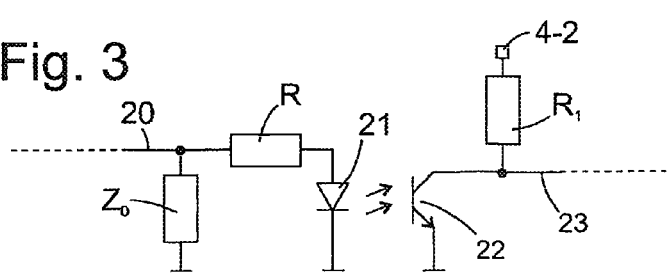
FIG. 3 shows a first embodiment of a potential separating device.

A first example of such a potential separating device 14 is an optocoupler as shown in FIG. 3. For the sake of simpler description, it is assumed that the potential separating device is situated in the segment of ring 5$r$ extending from wheel unit 3-3 to wheel unit 3-2, it being obvious that potential separating devices situated in other segments may have the same construction. The segment includes an asymmetrical input line 20, on which potential separating device 14 receives data from wheel unit 3-3, and an output line, on which the data are relayed to wheel unit 3-2. A series resistor R of an LED 21 and a resistor Z0, connected in parallel thereto between input line 20 and ground, determine the terminal resistance of input line 20. Light from LED 21 modulates the resistance of a phototransistor 22, whose collector is connected via a resistor to vehicle electrical system 4-2 and whose emitter is grounded. Output line 23 originates from the collector of phototransistor 22.

FIG. 4 shows a capacitive potential separating device, which is assumed to be situated between wheel units 3-3, 3-2 like the potential separating device of FIG. 3. An input resistor R of potential separating device 14 is connected between input line 20 coming from wheel unit 3-3 and ground. A capacitor C connects input line 20 to a center point of a voltage divider, made of resistors R1, R2, connected between vehicle electrical system 4-2 and ground. The center point is also connected to an input of a threshold value circuit, in the form of a digital inverter 24 here, which is powered by vehicle electrical system 4-2 as is wheel unit 3-2.

The electrical elements of the potential separating device are dimensioned in such a way that they form a terminal resistance equal to the wave impedance of line 20 to avoid reflections. The coupling capacitance of capacitor C is approximately 10 times the input capacitance of inverter 24. This may be kept very low by implementing inverter 24 in CMOS technology, for example. The level loss of a signal transmitted via capacitor C is then limited to less than 10%, corresponding to the capacitive voltage division between capacitor and inverter input. The precise dimensioning of the capacitance is a function of the voltage excursion at the input of inverter 24 and of its operating point. The operating point is settable by the ratio of resistors R1 and R2 and is to be set somewhat above the switching threshold of inverter 24, so that slight interference and noise do not have any influence on the output signal of the inverter. It may be taken into consideration whether in idling operation (without a signal from line 20) the potential separating device is to assume an operating point in which inverter 24 consumes as little power as possible. The absolute resistance values of resistors R1 and R2 are designed in such a way that resulting time constant R*C in potential separating device 14 is significantly greater than the maximum time period in which the level of the signal supplied via line 20 remains constant. This time period is a function of the data rate transmitted on the segment and the type of coding of the data. R is a resistance value which results from the parallel circuit of R1 and R2 and the input resistance of inverter 24 (unless it may be assumed to be infinite).

FIG. 5 shows a potential separating device having symmetrical input line 20, between whose two cores input resistor Z0 is connected. The two cores are each connected via a capacitor C to nodes of a voltage divider formed from resistors R1, R2, R3 connected in series. An inverter 24 is connected to one of these nodes, whose output drives output line 23. The mode of operation of the potential separating device from FIG. 5 is essentially the same as in the potential separating device according to FIG. 4. It is only to be considered in the dimensioning of the components that, because capacitors C are effectively connected in series, their effective joint capacitance is half of the capacitance of each single one of them.

In the potential separating devices of FIGS. 4 and 5, the logical level of the signals is inverted upon passage, i.e., a high-level pulse which is incident on line 20 is output as a low-level pulse on line 23, and vice versa. This fact may be taken into consideration at the processing units receiving the signals, or a second inverter may be incorporated in series with inverter 24 to cause another level inversion.

To allow it to pass through capacitors C of the potential separating devices of FIGS. 4 and 5 uncorrupted, the coding, using which the data signals are transmitted on lines 20, 23, must be free of DC current on average, and the maximum time span over which the level of the signals may remain constant must be limited. This is achievable by suitable coding of the signals. If an appropriate coding of the signals is not desired for the communication between the processing units, as shown in FIG. 6, each potential separating device 14 may have a first code converter 25 connected upstream and a second code converter 26 connected downstream, whose function in each case is to convert data signals, which are received in an arbitrary representation format and/or an arbitrary coding from an upstream processing unit at first code converter 25, into pulse-width-limited coding which is free of DC current on average and suitable for transmission via potential separating device 14 and to convert this (back) into the original—or possibly also a third—representation format, which is processable by a downstream processing unit, after passing potential separating device 14.

The processing units on ring bus 8 may also include a gateway unit 27, whose function is essentially to support the data exchange between processing units on ring bus 8 and processing units on another bus system 28. For the description of gateway unit 27 and its mode of operation with reference to FIG. 7, it is assumed that processing units on ring bus 8 are powered by a vehicle electrical system 4-1 and processing units on bus system 28 are powered by a vehicle electrical system 4-3. As shown in FIG. 1, processing units powered by a further vehicle electrical system 4-2 may also be present on ring bus 8, but this is not necessary for the function of gateway unit 27. Gateway unit 27 is powered in parallel by both vehicle electrical units 4-1, 4-3, a diode 29 or another suitable decoupling element being provided between the two vehicle electrical systems and a supply voltage input of gateway unit 27, which prevents the other vehicle electrical system from also being overloaded by a short-circuit in one of the vehicle electrical systems.

Gateway unit 27 has two data inputs, which are each connected to ring bus 8 and/or bus system 28 via a first code converter 25 and a potential separating device 14, as well as two data outputs, which are in turn connected to ring bus 8 and/or bus system 28 via a potential separating device 14 and second code converter 26. Code converters 25, 26 on the side of ring bus 8 are powered by vehicle electrical system 4-1; those on the side of bus system 28 are powered by vehicle electrical system 4-3. If one of these vehicle electrical systems fails, such as vehicle electrical system 4-1, code converters 25, 26 as well as processing units on ring bus 8 (not shown in FIG. 7) also fail, but gateway unit 27 per se remains operationally ready and capable of signaling the failure of the units on ring bus 8 to processing units on the side of bus system 28. This is true correspondingly in the reverse direction in the event of a failure of vehicle electrical system 4-3.

A gateway of the type shown in FIG. 7 may in turn be used as a potential separating device in a bidirectional reconfigurable ring bus having a similar topology as shown in FIG. 1. Such an application is shown in FIG. 8. Elements which correspond to those described with reference to FIG. 1 are identified by the same reference numerals and are not discussed again. The system includes two bus sections 8-1, 8-2, which are linked at two points via gateway units 27-1, 27-2. First section 8-1 may be understood as a unidirectional ring bus having segments 6-1 between wheel unit 3-1 and gateway unit 27-1, 6-2 between two gateway units 27-1 and 27-2, 6-3 between gateway unit 27-2 and wheel unit 3-3, 6-4 between wheel unit 3-3 and control unit 2-1, and 6-5 between control unit 2-1 and wheel unit 3-1. Section 8-2 has a similar construction having segments 7-1 through 7-5. As long as the system operates without interference, gateway unit 27-1 transmits all data received on segment 6-1 of section 8-1 to segment 7-1 of section 8-2, and gateway unit 27-2 transmits all data received on segment 7-3 to segment 6-3. The failure of a vehicle electrical system, such as vehicle electrical system 4-1, is registered by gateway units 27-1, 27-2 and has the result that unit 27-2 deflects data received on segment 7-3 on to segment 7-4. Symmetrically thereto, gateway unit 27-1 responds by deflecting the data now received on segment 7-2 on to segment 7-1. This means that whenever the vehicle electrical system of one of sections 8-1, 8-2 fails, the segments of the particular other section are combined into a ring bus on which the units not affected by the failure may communicate further.

What is claimed is:

1. A vehicle-supported data processing system, comprising:
   processing units communicating with one another via a bus system, which are powered by respectively at least one of at least two different vehicle electrical systems;
   transmitter units for control information; and
   receiver units for the control information being among the processing units;
   wherein:
      the bus system is a reconfigurable ring bus, in which each processing unit is connected to at least two adjacent processing units by respectively one bus segment,
      the ring bus is divided into a plurality of sections, each section including a plurality of connected processing units, and each processing unit in any particular section being powered by the same vehicle electrical system,
      the ring bus includes a plurality of potential separating devices, each of which is located in a bus segment that connects two processing units powered by different ones of the at least two different vehicle electrical systems, thereby forming the plurality of sections,
      the number of sections is less than the number of processing units, and
      the potential separating devices reconfigure the ring bus by combining sections in which the processing units are powered by the same vehicle electrical system to form a new ring bus, and
   wherein a failure of one of the processing units or its vehicle electrical system only results in an interruption of the communication via the failed processing unit or the processing units powered by the failed vehicle electrical system, so that processing units powered by another one of the vehicle electrical systems, more than one of which lie on the same section, are not affected by the interruption.

2. The data processing system of claim 1, wherein the number of the sections is equal to the number of the vehicle electrical systems.

3. The data processing system of claim 1, wherein the ring bus is bidirectional.

4. The data processing system of claim 1, wherein each receiver unit one of exclusively and at least preferentially process instructions of a transmitter unit which is powered by the same vehicle electrical system as the receiver unit.

5. The data processing system of claim 1, wherein the potential separating devices include optocouplers.

6. The data processing system of claim 1, wherein the potential separating devices include capacitors connected between a data input and a data output.

7. The data processing system of claim 6, wherein the capacitor is connected to the data output via a threshold value circuit having a high-resistance input.

8. The data processing system of claim 1, wherein each of the receiver units processes received control information to control a respective one of multiple identical devices of the vehicle on the basis of the received control information.

9. The data processing system of claim 8, wherein the identical devices are brakes.

10. The data processing system of claim 9, wherein the receiver units of the brakes of wheels lying diagonally opposite each other on the vehicle are located on the same section of the ring bus.

11. The data processing system of claim 1, wherein at least one gateway which supports the data traffic between the ring bus and a second bus connected to the gateway is among the processing units.

12. The data processing system of claim 11, wherein each at least one gateway is also a respective one of the potential separating devices.

13. The data processing system of claim 1, wherein the reconfiguring is performed by the potential separating devices in response to detecting a failure of a vehicle electrical system, by combining sections in which the processing units are not powered by the failed vehicle electrical system.

14. The data processing system of claim 1, wherein the number of the sections is equal to the number of the vehicle electrical systems, and wherein the ring bus is bidirectional.

15. The data processing system of claim 14, wherein each receiver unit one of exclusively and at least preferentially process instructions of a transmitter unit which is powered by the same vehicle electrical system as the receiver unit, and wherein the potential separating devices include optocouplers.

16. The data processing system of claim 14, wherein the potential separating devices include capacitors connected between a data input and a data output, and wherein the capacitor is connected to the data output via a threshold value circuit having a high-resistance input.

17. The data processing system of claim 14, wherein each of the receiver units processes received control information to control a respective one of multiple identical devices of the vehicle on the basis of the received control information, and wherein the identical devices are brakes.

18. The data processing system of claim 17, wherein the receiver units of the brakes of wheels lying diagonally opposite each other on the vehicle are located on the same section of the ring bus.

19. The data processing system of claim 14, wherein at least one gateway which supports the data traffic between the ring bus and a second bus connected to the gateway is among the processing units.

20. The data processing system of claim 19, wherein each at least one gateway is also a respective one of the potential separating devices.

21. The data processing system of claim 14, wherein the reconfiguring is performed by the potential separating devices in response to detecting a failure of a vehicle electrical system, by combining sections in which the processing units are not powered by the failed vehicle electrical system.

22. The data processing system of claim 1, wherein the number of the sections is equal to the number of the vehicle electrical systems, wherein the ring bus is bidirectional, wherein each receiver unit one of exclusively and at least preferentially process instructions of a transmitter unit which is powered by the same vehicle electrical system as the receiver unit, wherein the potential separating devices include optocouplers, wherein the potential separating devices include capacitors connected between a data input and a data output, wherein the capacitor is connected to the data output via a threshold value circuit having a high-resistance input, and wherein each of the receiver units processes received control information to control a respective one of multiple identical devices of the vehicle on the basis of the received control information.

23. The data processing system of claim 22, wherein the identical devices are brakes, wherein the receiver units of the brakes of wheels lying diagonally opposite each other on the vehicle are located on the same section of the ring bus, wherein at least one gateway which supports the data traffic between the ring bus and a second bus connected to the gateway is among the processing units, and wherein each at least one gateway is also a respective one of the potential separating devices, and wherein the reconfiguring is performed by the potential separating devices in response to detecting a failure of a vehicle electrical system, by combining sections in which the processing units are not powered by the failed vehicle electrical system.

* * * * *